(12) United States Patent
Testa et al.

(10) Patent No.: US 10,162,118 B2
(45) Date of Patent: Dec. 25, 2018

(54) OPTICAL COUPLING ELEMENT

(71) Applicant: Telefonaktiebolaget LM Ericsson (publ), Stockholm (SE)

(72) Inventors: Francesco Testa, Pisa (IT); Marco Romagnoli, Pisa (IT); Luigi Tallone, Pisa (IT)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 15/547,774

(22) PCT Filed: Feb. 3, 2015

(86) PCT No.: PCT/EP2015/052166
§ 371 (c)(1),
(2) Date: Jul. 31, 2017

(87) PCT Pub. No.: WO2016/124224
PCT Pub. Date: Aug. 11, 2016

(65) Prior Publication Data
US 2018/0024298 A1   Jan. 25, 2018

(51) Int. Cl.
*G02B 6/30* (2006.01)
*G02B 6/42* (2006.01)
(Continued)

(52) U.S. Cl.
CPC ............... *G02B 6/30* (2013.01); *G02B 6/124* (2013.01); *G02B 6/13* (2013.01); *G02B 6/34* (2013.01); *G02B 6/4214* (2013.01); *G02B 6/421* (2013.01); *G02B 6/4206* (2013.01); *G02B 6/4292* (2013.01); *G02B 2006/12061* (2013.01);
(Continued)

(58) Field of Classification Search
None
See application file for complete search history.

(56) References Cited

U.S. PATENT DOCUMENTS

| | | | |
|---|---|---|---|
| 8,270,788 B2 * | 9/2012 | Herman | G02B 6/02128 264/1.37 |
| 2012/0234807 A1 * | 9/2012 | Sercel | B23K 26/0608 219/121.69 |

(Continued)

FOREIGN PATENT DOCUMENTS

| | | |
|---|---|---|
| EP | 2666042 A1 | 11/2013 |
| WO | 2012099689 A1 | 7/2012 |

OTHER PUBLICATIONS

PCT International Search Report, dated Sep. 30, 2015, in connection with International Application No. PCT/EP2015/052166, all pages.

(Continued)

*Primary Examiner* — Sung H Pak
(74) *Attorney, Agent, or Firm* — Leffler Intellectual Property Law, PLLC

(57) ABSTRACT

A method of manufacturing a coupling element configured to couple light between an optical device and one or more optical fiber comprises forming one or more waveguide in the silica. The one or more waveguide having a refractive index configured to guide the light between the optical device and the optical fiber. The forming of the one or more waveguide comprises photo-inducing a refractive index variation of the silica material.

13 Claims, 2 Drawing Sheets

(51) Int. Cl.
G02B 6/13 (2006.01)
G02B 6/124 (2006.01)
G02B 6/34 (2006.01)
G02B 6/12 (2006.01)

(52) U.S. Cl.
CPC .......... G02B 2006/12104 (2013.01); G02B 2006/12147 (2013.01)

(56) References Cited

U.S. PATENT DOCUMENTS

| | | | |
|---|---|---|---|
| 2013/0208358 A1* | 8/2013 | Psaila | G02B 5/1857 359/566 |
| 2014/0056554 A1* | 2/2014 | Brunner | G02B 6/1221 385/14 |
| 2018/0017748 A1* | 1/2018 | Mir Shafiei | G02B 6/43 |

OTHER PUBLICATIONS

PCT Written Opinion, dated Sep. 30, 2015, in connection with International Application No. PCT/EP2015/052166, all pages.
Huang Huan et al., Femtosecond fiber laser direct writing of optical waveguide in glasses, Nanophotonics and Macrophotonics for Space Environments V, SPIE, Bellingham, WA, USA, vol. 8164, No. 1, Sep. 9, 2011, pp. 1-8.
Rafael R. Gattass et al., Femtosecond laser micromachining in transparent materials, Nature Photonics, vol. 2, Apr. 1, 2008, pp. 219-225.
K.M. Davis et al., Writing waveguides in glass with a femtosecond laser, Optics Letters, Optical Society of America, US, vol. 21, No. 21, Nov. 1, 1996, pp. 1729-1731.
C Florea et al., Fabrication and Characterization of Photonic Devices Directly Written in Glass Using Femtosecond Laser Pulses, Journal of Lightwave Technology, vol. 21, No. 1, Jan. 2003, pp. 246-253.
S. Nolte et al., Femtosecond waveguide writing: a new avenue to three-dimensional integrated optics, Applies Physics A, vol. 77, No. 1, Jun. 1, 2003, pp. 109-111.
P. De Dobbelaere et al., Packaging of Silicon Photonics Systems, Optical Society of America, 2014, 3 pages.
Tymon Barwicz et al., Low-Cost Interfacing of Fibers to Nanophotonic Waveguides: Design for Fabrication and Assembly Tolerances, IEEE Photonics Journal, vol. 6, No. 4, Aug. 2014, 19 pages.
A. Saliminia et al., Writing optical waveguides in fused silica using 1 kHz femtosecond infrared pulses, AIP Journal of Applied Physics, vol. 93, No. 7, Apr. 1, 2003, 6 pages.
T. Barwicz et al., Assembly of Mechanically Compliant Interfaces between Optical Fibers and Nanophotonic Chips, IEEE 64th ECTC, Orlando, FL, USA, May 27-30, 2014, 14 pages.

* cited by examiner

OPTICAL COUPLING ELEMENT

TECHNICAL FIELD

The present invention relates to an optical coupling element, optical coupling system and a method of manufacturing an optical coupling element.

BACKGROUND

Silicon photonics technology is extending its utilization from current low-medium volume application as multi-channel transceivers in data center interconnection, to a more common use as optical multi-chip modules (OMCM). Such OMCM are used in high bandwidth hardware platforms for chip to chip and board to board interconnects. OMCM integrates in the same package an electronic and photonic chip with reduced power consumption, high processing capacity and low footprint and may be used in high capacity switches for data centers and in big IP routers. In typical OMCM the signal processing is performed by an electronic chip while the I/Os are performed by a photonic chip which is interconnected with optical fibers.

A significant issue is providing removable optical connectors between the silicon photonic chip and an optical fiber array, e.g. single mode fiber array. The connector has to provide for many fibers (12 or more), and has to be suitable for mass production.

For example, the connector should be mounted during the packaging process by using standard assembly machines and be compatible with printed circuit board (PCB) soldering processes (e.g. withstanding high temperature (about 260 degree Centigrade) for a time duration of 30 to 60 seconds.

P. De Dobbelaere et al: 'Packaging of Silicon Photonics Systems', Proceedings of OFC 2014, paper W3I.2 describes a single mode ribbon fiber coupling to silicon photonics nano-waveguides. This is based on the use of an array of vertical grating couplers implemented in the silicon chip and the use of a glass V-block that holds the fiber array by means of V-grooves. The V-block is actively aligned to the grating coupler array and then it is bonded to the chip by an adhesive. The use of vertical couplers, a V-groove and a ribbon fiber pigtail has the disadvantage of not being compatible with a PCB soldering process in which, during a reflow soldering step, the optical module is attached to PCB pads. In addition, a complex mechanical interaction is required between the chip and the package due to the fact that the ribbon fiber is mounted on the chip vertically.

T. Barwicz, Y. Taira: low-Cost Interfacing of Fibers to Nanophotonic Waveguides: Design for Fabrication and Assembly Tolerances' IEEE Photonics Journal, Vol. 6 N. 4, August 2014 describes a polymer waveguide bridge that includes routing waveguides and an adiabatic coupler to connect a standard ribbon fiber connector to the nano-waveguides in the silicon chip. This does not use diffractive coupling elements. The polymer waveguide gap element has a room occupancy in the range of millimeters, which is comparable with the dimensions of a photonic chip.

SUMMARY

According to a first aspect of the present invention, there is provided a method of manufacturing a coupling element configured to couple light between an optical device and one or more optical fiber. The method comprising forming one or more waveguide in silica material of the coupling element, the one or more waveguide having a refractive index configured to guide the light between the optical device and the optical fiber. The forming of the one or more waveguide comprises photo-inducing a refractive index variation of the silica material.

Thus, a coupling element effectively couples light between an optical device and an optical fiber.

According to another aspect of the present invention there is provided a coupling element configured to couple light between an optical device and one or more optical fiber. The coupling element comprising silica material defining one or more waveguide, the waveguide comprising silica material having a refractive index configured to guide the light between the optical device and the optical fiber. The one or more waveguide comprises a photo-induced refractive index variation of the silica material.

According to another aspect of the present invention there is provided a coupling system comprising a coupling element configured to couple light between an optical device and one or more optical fiber. The coupling element comprising silica material defining one or more waveguide, the waveguide comprising silica having a refractive index configured to guide the light between the optical device and the optical fiber. The one or more waveguide comprises a photo-induced refractive index variation of the silica material. The system further comprises a ferrule configured to connect with the optical coupler, wherein the ferrule comprises the one or more optical fiber.

Optionally, the generating of the refractive index variation of the silica is with a laser.

Optionally, the one or more waveguide comprises a first waveguide portion and a second waveguide portion extending in a different direction to the first waveguide portion.

BRIEF DESCRIPTION OF THE DRAWINGS

Embodiments will now be described, by way of example only, with reference to the accompanying drawings in which.

DETAILED DESCRIPTION

Examples relate to a coupling element which is configured to couple light between an optical device and one or more optical fibers. The optical device comprises an integrated circuit having an optical in/out connection. The optical device may also be referred to as a chip, microchip, system on a chip, photonic integrated circuit, photonic chip or silicon photonic chip. The term optical device is used in the following description for simplicity, although this term may be replaced by photonic chip or alternative term.

The coupling element provides an interface for light received from the optical device, and transmits the light to the one or more optical fibers. In some examples, the coupling element also provides an interface for light received from the one or more optical fibers to the optical device. Thus, the coupling element is configured to couple light between the optical device and one or more optical fiber.

Figure 1:
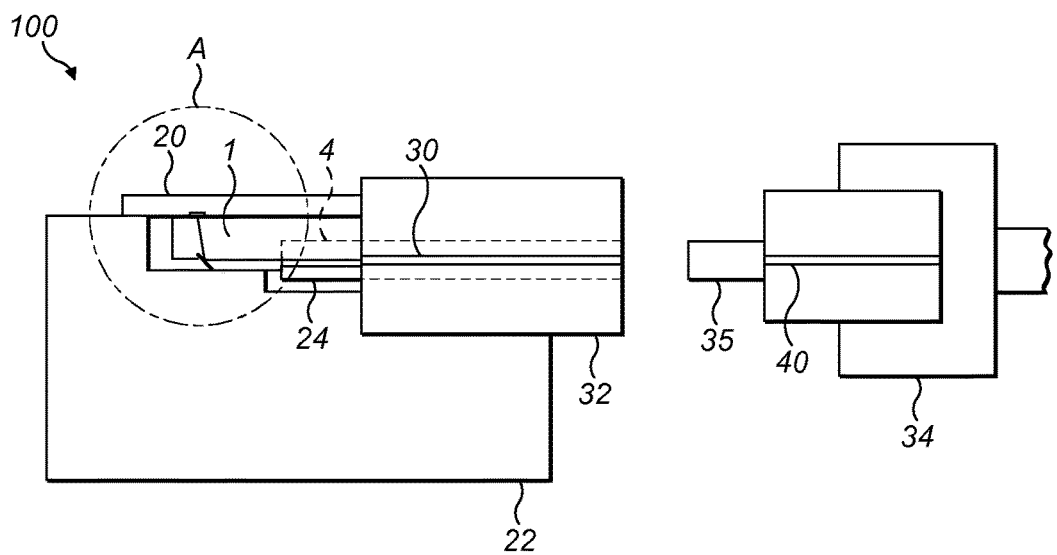
FIG. 1 shows an example of a system according to an example.

FIG. 1 shows an example of the coupling element 1 as part of a system 100. The system 100 comprises at least one of an optical device 20 and one or more optical fibers 30. In the view shown, only one optical fiber is visible. Further optical fibers 30 may be arranged in the plane of the optical fiber, e.g. behind or in front of the optical fiber 30 shown. The coupling element 1 couples light between the chip 20 and the optical fiber(s) 30. The coupling element 1 may be considered as an optical coupling element.

In some aspects, the coupling element 1 is configured to connect to a ferrule 32 supporting the optical fiber 30. The ferrule 32 comprises one or more alignment pin 24 configured to fit into a groove 4 of the coupling element. The alignment pin 24 is configured to provide self-alignment with the coupling element 1. In some examples, the groove 4 is formed by a photolithographic process.

A support structure 22 is configured to support one or more of the coupling element, ferrule 32 and optical device 20.

In some examples, the ferrule 32 is configured to be permanently optically connected to the coupling element. For example, the ferrule 32 is permanently attached to the support structure 22 and/or optical device.

The ferrule 32 is configured to receive a connector 34. The connector 34 supports one or more optical fibers 40. The connector 34 comprises an alignment pin 35 configured to fit into the ferrule 32. The alignment pin 35 configured to provide self-alignment with the ferrule 32. In some examples, the alignment 35 is received in a groove (not shown) of the ferrule 32.

The connector 34 is removable from the ferrule 32. As such, the connector 34 is configured to be removably connected to the ferrule 32. Thus, the optical fiber 40 can be removably or temporarily connected with the optical device. The ferrule 32 provides an interface for connection of an optical fiber 40 (as part of the connector 34) with the coupling element 1, and hence the optical device 20.

In some aspects, the system 100 comprises one or more of the support structure 22, alignment pin 24, ferrule 32, connector 34, alignment pin 35 and/or optical fiber(s) 40. The system 100 is configured to guide light between the optical device 20 and the optical fiber 40.

The optical device 20 is configured to generate and/or receive light, e.g. laser light. For example, the optical device 20 comprises an integrated or hybrid source of laser light. In some cases, the optical device 20 also comprises a modulator (not shown) for modulating the light generated. The optical device 20 may also comprises circuits for electrically generating or processing a signal to be transmitted on, or received from, the optical fibers. The optical device (e.g. chip) may be considered as substantially planar or extending in a plane. A side profile of the optical device is shown in FIG. 1. The optical device 20 is configured to transmit or receive light out of the plane of the optical device 20, e.g. perpendicular to the plane of the optical device.

Figure 2:
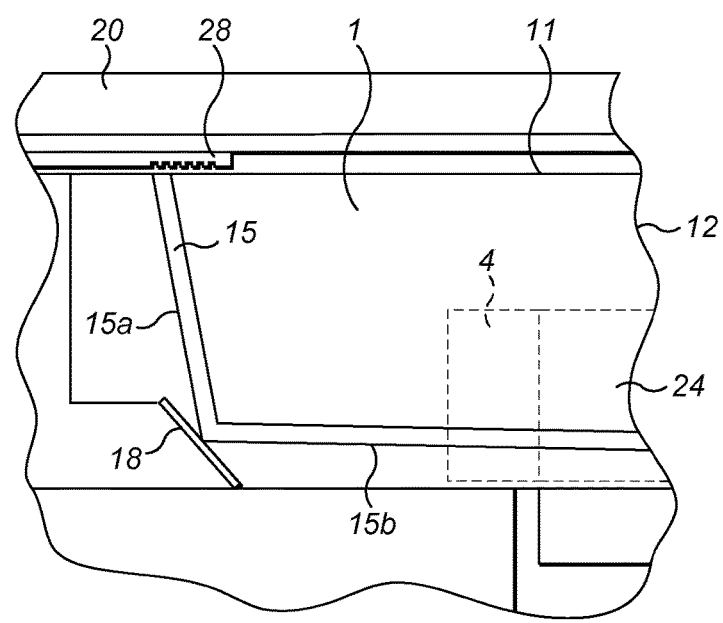
FIG. 2 shows a larger view of a part of the example.

FIG. 2 shows further details of the coupling element 1 and system 100, corresponding to an enlarged view of area A in FIG. 1. In this example, the system 100 comprises a grating coupler 28. The grating coupler 28 is located between the optical device 20 and coupling element 1. The grating coupler 28 is configured to couple light from a photonic wire (not shown) of the optical device 20 to the coupling element 1.

The grating coupler 28 is configured such that for specific combinations of incident angles and light frequency, there is a resonance. This allows the grating coupler 28 to couple light into a guided mode of the waveguide 15. The grating coupler 28 may be considered as part of the coupling element 1 or the system 100.

The grating coupler 28 (and optical device 20) is on (adjacent) to a first side 11 of the coupling element 1. The ferrule 32 and optical fiber(s) 30 are coupled to a second side 12 of the coupling element 1. On the second side 12, the alignment pin 24 of the ferrule 32 is configured to extend only partially into the groove 4.

The first side 11 and second side 12 are on different sides or surfaces of the coupling element 1. In some examples, the first side 11 extends approximately perpendicularly to the second side 12. The first and second sides 11,12 are at 90 degrees to each other. The first side 11 and second side 12 are different sides, and in some examples, adjacent sides. The first and second sides 11,12 may be physical sides of the coupling element 1, or may be considered as virtual sides indicated by the optical device 20 and fiber(s) 30. For example, the optical device 20 and fiber(s) 30 may be considered as transmitting/receiving light in a direction (approximately) perpendicular to the respective first and second sides 11,12. The plane of the optical device 20 is substantially parallel to a plane of the first side 11.

The coupling element 1 is configured to guide light between the optical device 20 and the optical fiber(s) 30. In some aspects, the coupling element may be considered as guiding light between the optical device 20 and optical fiber(s) 40. In order to do so, the coupling element 1 is configured to guide the light between the first side 11 and the second side 12. In some aspects, the first side 11 and second side 12 are not directly opposite to each other.

In some examples, the coupling element 1 comprises one or more waveguide 15. The one or more waveguide is configured to guide light between the optical device 20 and optical fiber 30. The one or more waveguides 15 are integrally formed within the coupling element 1. In some examples, the one or more waveguides 15 have a different refractive index than adjacent material. The refractive index of the one or more waveguides 15 is selected to guide, or retrain, the light within the waveguide. This provides for efficient transfer of light between the optical device 20 and the optical fiber(s).

The coupling element 1 is made of silica. This material may alternatively be referred to as silica glass. The one or more waveguide 15 is also formed of silica. The one or more waveguide 15 also comprises silica, integrally formed from the silica material of the coupling element 1.

In some examples, the one or more waveguide 15 is made using laser scribing. In this method of manufacture, a laser is used to scribe the waveguides. The waveguides 15 are formed by the laser in the silica material of the coupling element 1.

The laser scribing process comprises the absorption of laser pulses, e.g. ultra-fast laser optical pulses, by the silica glass. The laser is arranged to change the silica glass refractive index. Thus, the laser generates a change in the refractive index of the silica material to form the one or more waveguide, such that the waveguide can guide the light between the optical device and optical fibers.

The method directs the laser according to a three dimensional pattern, such that the refractive index is changed according to the three dimensional spatial pattern. Thus, the one or more waveguide 15 is formed in three dimensions within the body of the coupling element 1.

The method of generating the optical waveguides 15 may use a pulsed laser, for example providing pulses in order of femtoseconds. The laser generates a photo-induced refractive index variation. This photo-induced refractive index variation defines the waveguides.

For example, the received silica material of the coupling element has a refractive index which is uniform. The silica material initially does not have a refractive index variation which defines waveguides to couple light between the optical device and optical fiber. The refractive index is varied by the applied light (e.g. laser) in the method of manufacturing. The photo-induced refractive index variation generates a refractive index which is different within the waveguide than the refractive index in the remainder of the surrounding silica material. The difference in refractive index provides for guidance of light through the silica material, along the waveguide of a different refractive index.

This method has an advantage of being able to create waveguides of an arbitrary shape. In this example, the method provides for creating optical waveguides at an angle compatible with the output beam of a grating coupler. The method allows waveguides in a plurality of portions to be created, as described below.

The method allows the realization of waveguides with a numerical aperture that is substantially the same, or similar, to one or both of the output beam of a grating coupler and of a single mode fiber. The numerical aperture of the waveguide is selected such that light from the waveguide is within an acceptance angle of the fiber 30 and/or grating coupler. The numerical aperture of the waveguide is selected such that light from the fiber 30 and/or grating coupler is within an acceptance angle of the waveguide.

The method of laser scribing described allows use of a block of silica glass as the material of the coupling element. The silica glass provides for forming lithographic alignment fiducials and/or grooves.

The coupling element 1 comprises a plurality of waveguides. The plurality of waveguides may be considered as an array of waveguides 15. The optical fibres 30, 40 may be an array of a plurality of optical fibers. In some examples, each waveguide separately guides light between one output/input of the optical device and one optical fiber 30.

In some examples, each waveguide 15 may be considered as having a first waveguide portion 15a connected to a second waveguide portion 15b. Light travels sequentially through the first waveguide portion 15a and second waveguide portion 15b, in any order. In some examples, the first waveguide portion 15a is a straight waveguide, and/or the second waveguide portion 15b is a straight waveguide. The first waveguide portion 15a and second waveguide portion 15b are angled relative to each other.

In some aspects, the first waveguide portion 15a extends in a different direction to the second waveguide portion 15b. The different direction is in a plane perpendicular to the first side 11 or perpendicular to the plane of the optical device 20. As such, the one or more waveguide comprises a first waveguide portion and a second waveguide portion extending in a different direction to the first waveguide portion.

In some aspects, the first waveguide portion 15a extends (has a longitudinal axis) approximately perpendicular to a plane of the optical device or first side 11. For an optical device which extends in a horizontal plane, the first waveguide portion 15a extends at least partially in a vertical direction, and in some examples extends substantially vertically or inclined to a vertical direction.

In some examples, the second waveguide portion 15b extends approximately parallel to a plane of the optical device or first side 11. For an optical device which extends in a horizontal plane, second waveguide portion 15b extends at least partially in a horizontal direction, and in some examples extends substantially horizontally or horizontally. In some examples, the second waveguide portion 15b extends in parallel to an axis of a connected part of the optical fiber.

At least a part of the waveguide 15, e.g. the second waveguide portion 15b, is wholly within the silica material of the coupling element 1. The second waveguide portion is surrounded by silica material. As such, the second waveguide portion 15b is surrounded by silica material whose refractive index has not been changed, e.g. by the laser. In particular, sides of the waveguide 15 which are perpendicular to the axis of the waveguide are surrounded by silica material. An end of the second waveguide portion 15b only is in contact with an exterior surface of the coupling element, e.g. at the second side 12. The second waveguide portion 15b is connected to the first side 11 by the first waveguide portion 15a, which extends in a different direction. For example, the first waveguide portion is configured to guide light into (or out of) a body of the silica material from (or to) the first side 11. The second waveguide portion is configured to guide light into (or out of) a body of the silica material from (or to) the second side 12.

The first waveguide portion 15a is configured to receive light from the grating coupler 28. The grating coupler 28 is configured to transmit light into the body of the silica material, i.e. in a direction out of the plane of the optical device or first side 11. In some examples, the grating coupler 28 is configured to transmit light substantially perpendicularly to the plane of the optical device or first side 11, for example, along the first waveguide portion 15a. In some aspects, the first waveguide portion 15a is configured to receive light from the grating coupler 28 and extend in a direction away (e.g. vertically or into the body of the silica material) from the first side 11 supporting the grating coupler 28.

In some examples, light is transmitted between the first waveguide portion 15a and second waveguide portion 15b by a mirror 18. The mirror 18 is configured to deviate, or reflect, light from the first waveguide portion 15a into the second waveguide portion 15b, and from the second waveguide portion 15b into the first waveguide portion 15a. In some examples, the mirror 18 has a planar cross-section. In some examples, a plane of the mirror is orientated at 45 degrees to a surface, e.g. first side 11, of the coupling element.

In some examples, a method of manufacturing the optical coupling element comprises forming a mirror configured to reflect light between the first waveguide portion and the second waveguide portion. In some examples, the mirror 18 is formed by a lithographic process.

In some aspects, the silica coupling element is attached to the optical device (e.g. silicon chip) with a facet of the waveguide placed in contact with the vertical grating coupler formed on the optical device.

Light that exits vertically from the optical device is guided in the silica coupling element by the first waveguide portion 15a, deviated by the mirror 18 and propagates along the second waveguide portion 15b toward the output side of the second waveguide portion 15b. In front of the facet of the second waveguide portion 15b the multi-fiber ferrule 32 is attached with internal optical fibers 30 to guide the light toward the external side of the ferrule 32 that is in contact with the removable connector 34 for ribbon optical fibers 40. The ferrule 32 and connector 34 both comprise optical fibers. This provides for a simple removal and reconnection, since the two parts have the same type of guiding structures (fibers in this case). In particular, the same type of waveguides provide for easy (re-)alignment.

Thus, fiber to optical device (e.g. photonic chip) coupling is realized by using a silica element directly attached to the optical device in correspondence to the vertical grating coupler array. In the silica coupling element, the waveguides 15 are arranged to change the propagation direction (e.g. vertical) of optical beams coming from the optical device (e.g. photonic chip) into a substantially perpendicular (e.g. horizontal) direction to be coupled with an array of optical fibers 30;40.

Figure 3:
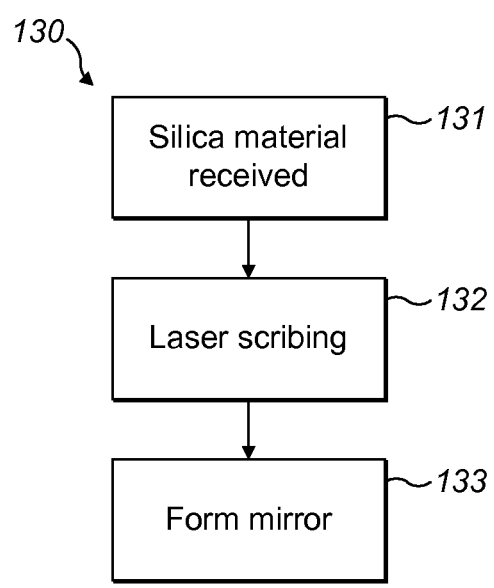
FIG. 3 shows a method of manufacturing a coupling element according to an example.

FIG. 3 shows an example method of manufacturing 130. Aspects may include any part of the described method, and may not require all the steps described. The order of the steps is an example only, the order may be different or steps may be carried out simultaneously.

In 131, silica material is received. The silica material will be further processed to form the silica coupling element. In some examples, the silica material has exterior surfaces which are already formed to the final dimensions and surface properties of the finished coupling element. In other examples, further processing to provide the exterior of the silica material is carried out later.

In 132, the method photo-induces a refractive index variation of the silica material. For example, the silica material is laser scribed. The method comprises generating the refractive index variation of the silica with a laser. This laser scribing introduces a refractive index variation, generating the waveguides 15 in the received silica material. In some examples, the laser scribing uses laser pulses. The method comprises generating the refractive index variation of the silica with a laser.

In 133, a mirror 18 is formed on the silica material, for example as described above. In some examples, the mirror 18 is formed by a lithographic process.

Aspects of the disclosure provide a silica coupling element with waveguides formed therein by photo-induced index variation generated by laser pulses. This laser scribing technique in a silica element allows the realization of waveguides with an arbitrary shape. The coupling element is configured to convert an array of optical beams coming out from a silicon chip, for example in a direction perpendicular to a plane of the chip, into an array of optical beams propagating parallel to the plane of the chip (e.g. horizontally) and ready to interface a removable connector 34, for example, having ribbon optical fiber 40.

Aspects are compatible with printed circuit board assembly production processes. The coupling element has a small footprint and a low profile design. The coupling element is compatible with CMOS production processes, providing for low cost and high throughput of manufacturing. The design of the coupling element means that no active alignment required. Removal of fiber pigtails provides for easy production handling.

In some aspects, the coupling element is configured to couple light between an optical device and one or more optical fiber. The coupling element comprising silica material defines one or more waveguide. The waveguide comprises silica material having a refractive index configured to guide the light between the optical device and the optical fiber. In the example described, the refractive index variation of the silica material is photo-induced, e.g. generated by a laser.

The invention claimed is:

1. A method of manufacturing a coupling element configured to couple light between an optical device and one or more optical fiber,
the method comprising:
forming one or more waveguide in silica material of the coupling element, the one or more waveguide having a refractive index configured to guide the light between the optical device and the optical fiber, wherein the one or more waveguide comprises a first waveguide portion and a second waveguide portion extending in a different direction to the first waveguide portion, and
forming a mirror configured to reflect light between the first waveguide portion and the second waveguide portion,
wherein the forming of the one or more waveguide comprises photo-inducing a refractive index variation of the silica material.

2. The method as claimed in claim 1, comprising generating the refractive index variation of the silica with a laser.

3. The method as claimed in claim 2, wherein the laser generates the refractive index variation using femtosecond pulses of laser light.

4. The method as claimed in claim 1, wherein the second waveguide portion is surrounded by silica material.

5. A coupling element configured to couple light between an optical device and one or more optical fiber,
the coupling element comprising:
silica material defining one or more waveguide, the one or more waveguide comprising silica material having a refractive index configured to guide the light between the optical device and the optical fiber, wherein the one or more waveguide comprises a first waveguide portion and a second waveguide portion extending in a different direction to the first waveguide portion; and
a mirror configured to reflect light between the first waveguide portion and the second waveguide portion,
wherein the one or more waveguide comprises a photo-induced refractive index variation of the silica material.

6. The coupling element as claimed in claim 5, wherein the refractive index variation of the silica material is generated by a laser.

7. The coupling element as claimed in claim 5, wherein the second waveguide portion is surrounded by silica material.

8. The coupling element as claimed in claim 5, comprising a grating coupler located between the optical device and the coupling element.

9. The coupling element as claimed in claim 8,
wherein the first waveguide portion is configured to receive light from the grating coupler and extend in a direction away from a first side of the coupling element adjacent to the grating coupler.

10. A coupling system comprising:
a coupling element configured to couple light between an optical device and one or more optical fiber,
the coupling element comprising silica material defining one or more waveguide, the one or more waveguide comprising silica having a refractive index configured to guide the light between the optical device and the optical fiber,
wherein the one or more waveguide comprises:
a photo-induced refractive index variation of the silica material;
a first waveguide portion and a second waveguide portion extending in a different direction to the first waveguide portion; and
a mirror configured to reflect light between the first waveguide portion and the second waveguide portion; and
a ferrule configured to connect with the optical coupler, wherein the ferrule comprises the one or more optical fiber.

11. The coupling system as claimed in claim 10, wherein the refractive index variation of the silica material is generated by a laser.

12. The coupling system as claimed in claim 10, further comprising a grating coupler located between the optical device and the coupling element.

13. The coupling system as claimed in claim 10, further comprising a connector comprising one or more additional optical fiber, wherein the connector is configured to connect with the ferrule,
   wherein the system is configured to guide the light between the optical device and the one or more additional optical fiber.

* * * * *